United States Patent [19]
Bosse et al.

[11] Patent Number: 5,085,566
[45] Date of Patent: Feb. 4, 1992

[54] APPARATUS FOR MANUFACTURING ORIENTED MULTI-PLY TAPES

[75] Inventors: Frank Bosse, Tecklenburg; Karl-Heinz Lage; Rainer Klose, both of Lengerich, all of Fed. Rep. of Germany

[73] Assignee: Windmoller & Holscher, Lengerich, Fed. Rep. of Germany

[21] Appl. No.: 451,344

[22] Filed: Dec. 18, 1989

[30] Foreign Application Priority Data

Dec. 19, 1988 [DE] Fed. Rep. of Germany ....... 3842764
Mar. 20, 1989 [DE] Fed. Rep. of Germany ....... 3909092

[51] Int. Cl.⁵ ............................................. B29C 53/02
[52] U.S. Cl. .......................................... 425/66; 26/71; 425/391
[58] Field of Search ............... 264/288.8, 103, 210.2, 264/285, 210.1, 339, 289.3, 289.6, 145-147, DIG. 47; 425/66, 505, 391; 26/71

[56] References Cited

U.S. PATENT DOCUMENTS

| | | | |
|---|---|---|---|
| 2,985,503 | 5/1961 | Becker | 264/103 |
| 3,356,783 | 12/1967 | Phillips | 264/285 |
| 3,372,222 | 3/1968 | Romesberg et al. | 264/285 |
| 3,448,187 | 6/1969 | Frost | 264/285 |
| 3,503,106 | 3/1970 | Port et al. | 264/103 |
| 3,514,368 | 5/1970 | Netsel | 161/177 |
| 4,252,550 | 2/1981 | Schlachter et al. | 425/66 |
| 4,861,249 | 8/1989 | Ruddell | 264/288.4 |

FOREIGN PATENT DOCUMENTS

| | | | |
|---|---|---|---|
| 1510636 | 4/1970 | Fed. Rep. of Germany . | |
| 3000686 | 9/1980 | Fed. Rep. of Germany . | |
| 1306629 | 9/1962 | France . | |
| 2094490 | 2/1972 | France . | |
| 2158727 | 6/1973 | France . | |
| 247952 | 12/1987 | France . | |
| 62-45715 | 2/1987 | Japan | 264/146 |
| 1172038 | 11/1969 | United Kingdom | 264/145 |
| 1182352 | 2/1970 | United Kingdom | 264/147 |
| 2193734 | 2/1988 | United Kingdom . | |

*Primary Examiner*—Jeffery Thurlow
*Attorney, Agent, or Firm*—Fleit, Jacobson, Cohn, Price, Holman & Stern

[57] ABSTRACT

In a process of manufacturing oriented tapes, which have been folded at least once, from synthetic thermoplastics, particularly for use in the manufacture of high-strength woven fabrics, the tapes are folded on themselves before they are wound on the spool used for their further processing.

3 Claims, 6 Drawing Sheets

APPARATUS FOR MANUFACTURING ORIENTED MULTI-PLY TAPES

BACKGROUND OF THE INVENTION

1. Field of the Invention

This invention relates to a process of manufacturing oriented tapes, which have been folded at least once, from synthetic thermoplastics, particularly for use in the manufacture of high-strength woven fabrics.

2. Description of the Prior Art

So-called container sacks having a large volumetric capacity consist of a woven fabric which has a high tensile strength and has been made from oriented tapes of synthetic thermoplastics. These tapes impart to the woven fabric such a high strength that the contents of the container sacks may have a weight, e.g., in excess of 1000 kg. For even heavier contents, the weight of the woven fabric per square meter must be increased.

The specific tensile strength of the tapes increases as their thickness increases. It is known that the strength of the woven fabric can be increased by an increase of the weight of the woven fabric per square meter by superimposing the tapes, which constitute the filling and warp threads, so that tapes consisting of two plies are obtained. But the manufacture of such two-ply tapes requires more expensive machinery and they can be woven only with difficulty. Other difficulties are due to the fact that it is much more difficult to wind up two-ply tapes than single-ply tapes.

SUMMARY OF THE INVENTION

For these reasons it is an object of the invention to provide a process which is of the kind described first hereinbefore and which can be used to make oriented tapes which have been folded at least once and which will behave like single-ply tapes as they are wound up and woven.

In a process of the kind described first hereinbefore that object is accomplished in accordance with the invention in that the tapes are folded on themselves before they are wound on the spool used for their further processing. In a preferred embodiment, at least two superimposed tapes are folded on themselves before they are wound up on the spool used for their further processing.

Desirably, at least two coextensive superimposed tapes are folded on themselves before they are wound up on the spool used for their further processing.

The tapes may be folded on themselves before or after they are stretched. In order to reliably prevent an unfolding of the tapes when they have been folded on themselves, the tapes are folded on themselves before or after they are stretched and before they are heat-set. Alternatively, the tapes may be folded on themselves before or after they are heat-set. Because the tapes contain sufficient internal heat even when they have been heat-set, that practice will prevent a subsequent unfolding.

It is desirable to fold the two marginal portions of the tapes onto their middle portions so that infolded portions lie in planes which are parallel to the middle portion of the tapes. The side edges of the infolded portions may adjoin each other and may be juxtaposed or may overlap each other so that the tapes are highly homogeneous.

In accordance with a further feature of the invention, the two marginal portions of the tapes are folded onto the middle portions of the tape so as to overlap each other. The marginal portions of the tapes suitably overlap each other to such an extent that the infolded plies have substantially the same width.

In a different embodiment of the invention, a tape which has been folded to have three plies is formed in that the overlapping folded parts are formed from a single-ply tape.

The folding operations may be performed in that the tapes are repeatedly folded on themselves.

In a particularly desirable embodiment of the invention, the tapes consist essentially of a mixture comprising 90 to 70% polypropylene and 10 to 30% of a plastic which has a higher adhesion at an elevated temperature than polypropylene base material. Polypropylenes are particularly suitable as a material for making tapes because they may be uniaxially stretched to impart to the chains a three-dimensional orientation, which results in a higher strength. On the other hand, folded tapes of polypropylene tend to unfold because tapes of polypropylene do not or only slightly adhere to each other and the tape cannot reliably be maintained in its folded shape even by heat setting. But a stably folded tape will be obtained if 10 to 30% by weight of plastics which at an elevated temperature have a higher adhesion than the polypropylene base material are admixed to the polypropylene because the plies which have been folded one onto the other will stick to each other under the action of heat. As a result, the undesired unfolding of the folded tapes will reliably be avoided.

An apparatus for manufacturing oriented and heat-set tapes, which have been folded on themselves, by the process according to the invention consists of a stretching and setting mechanism comprising godets, over which the set of tapes are caused to move in the form of consecutive loops, which are open in mutually opposite directions, and is characterized in accordance with the invention in that folding means are interposed between two godets. Each of the folding means consists of a bottom plate, which is substantially parallel to the incoming tape, and shell-like folding portions, which laterally adjoin said bottom plate and have openings facing each other and have a radius of curvature which decreases in the direction of travel and in the direction of travel approach each other so that the final distance between them is approximately as large as the width of the non-folded middle portions of the tapes. If it is desired that the infolded marginal portions of the tapes should overlap each other, those shell-like folding portions which face each other will have a radius of curvature which decreases in the direction of travel and said folding portions will nonsymmetrically approach each other in the direction of travel to a final distance which is approximately as large as the width of the non-folded middle portions of the tapes.

DETAILED DESCRIPTION OF THE PREFERRED EMBODIMENTS

Figure 1:
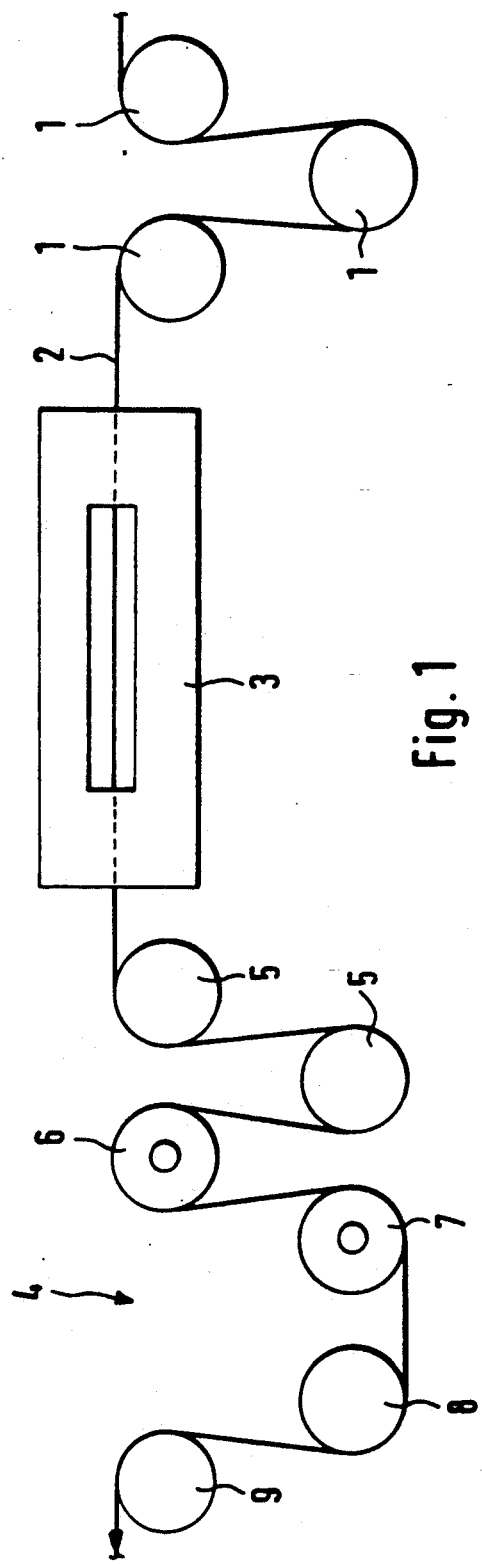
FIG. 1 is a diagrammatic side elevation showing a tape-stretching plant.

Illustrative embodiments of the invention will now be described more in detail with reference to the drawing.

In the tape-stretching plant which is diagrammatically shown in FIG. 1, a set of superimposed tapes 2 are trained in the form of loops around the rollers 1 of a retaining mechanism. From the retaining mechanism, the set of superimposed tapes 2 are moved into a hot air oven 3 of usual type. The set of tapes 2 leaving the hot air oven 3 are then moved through a so-called drawing and setting mechanism 4, which consists of the godets 5 to 7, one or more of which are heated. The godets 5 to 7 constitute the so-called drawing frame. Behind the last heated roller or godet the set of tapes 2 are moved through the so-called setting section of the drawing and setting mechanism. That setting section is constituted by the godets 8 and 9, which rotate at a lower surface speed than the last godet 7 of the drawing frame. As a result, each tape 2 can shrink and will thus be set.

Figure 2:
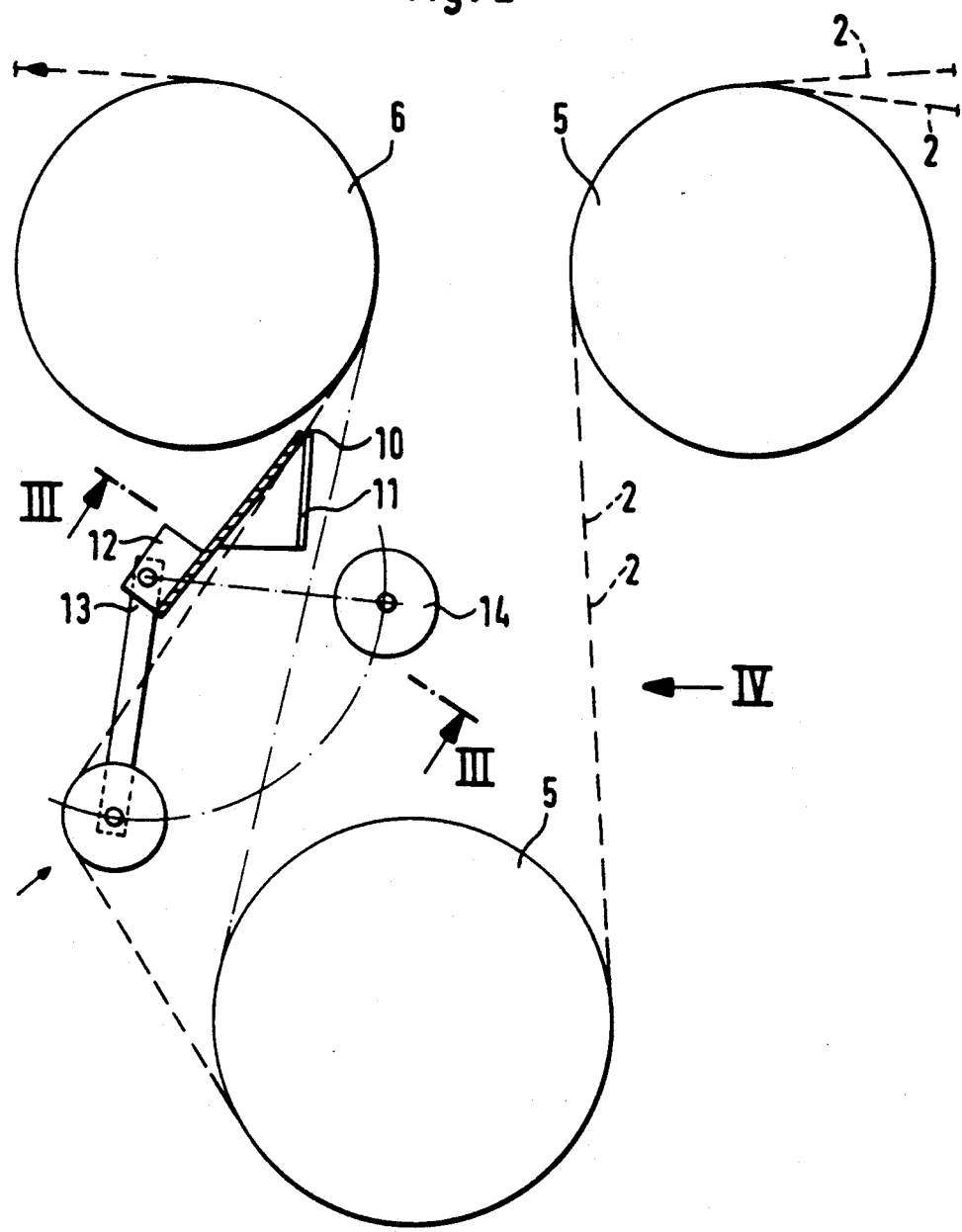
FIG. 2 is a longitudinal sectional view showing tape-folding means disposed between two godets of the drawing frame of the tape-stretching plant.
Figure 3:
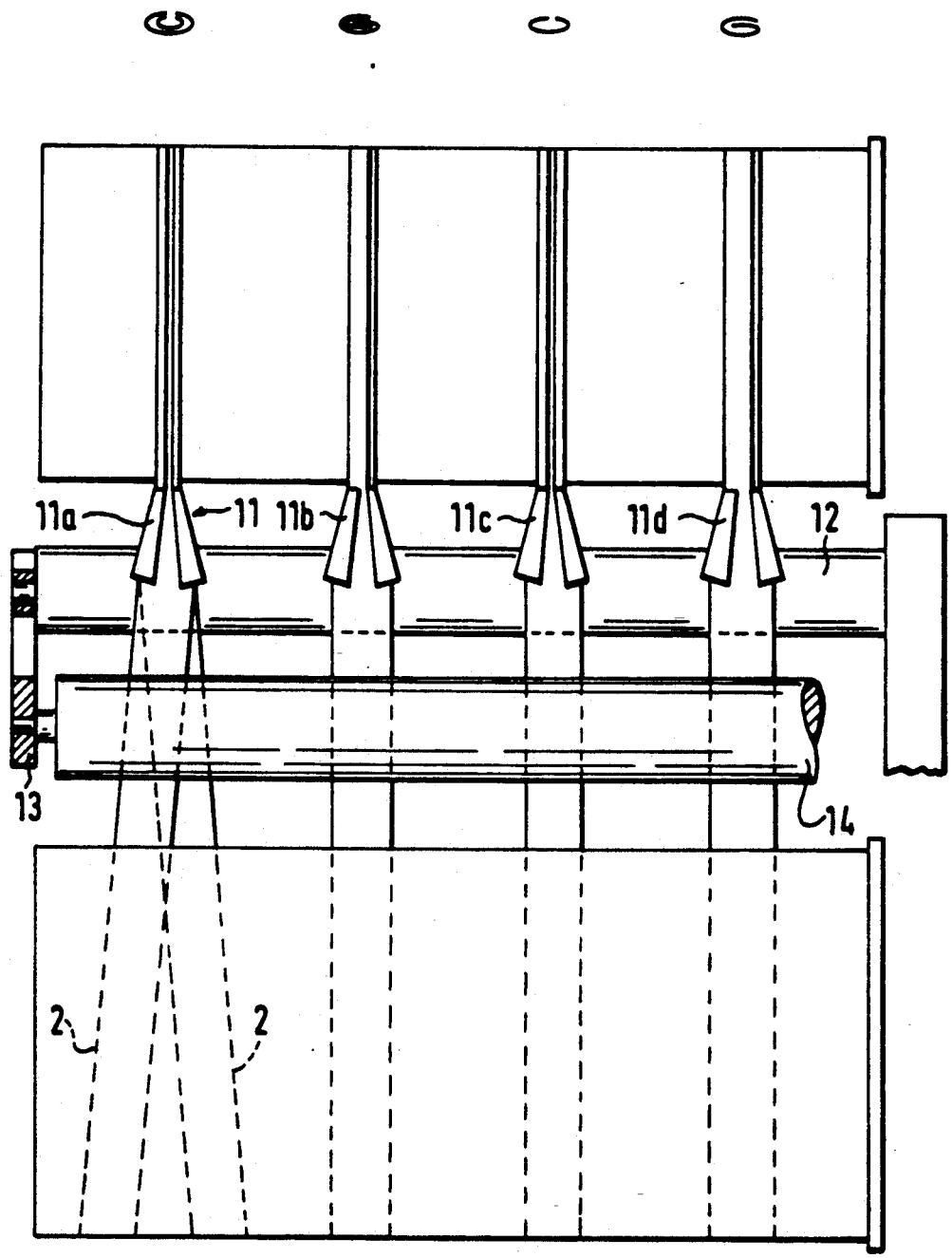
FIG. 3 is an elevation showing the folding means viewed in the direction indicated by the arrow IV in FIG. 2.

As is apparent from FIG. 2, means for folding each tape are provided between the godet 5 which receives the superimposed tapes and the godet 6. Said folding means comprise a flat bottom plate 10, which is surrounded by a slotted shroud 11, which tapers in the direction of travel of the tapes. The folding means are adjustably mounted on a carrier 12 which is secured to the housing and which, as is shown in FIG. 3, comprises laterally disposed swivel arms 13, in which a roller 14 is rotatably mounted. By means which are not shown, the roller 14 can be fixed in its operating position, shown in solid lines, and in a neutral inner position. The tapes 2 are folded on themselves by the folding means. The folded tapes 2 are shown above the roller 6 in FIG. 3 and in cross-section in FIGS. 3a to 3d. The folded tapes are heated by the succeeding heated godet 6 so that the superimposed plies can adhesively be bonded to each other.

FIG. 3 shows by way of example four different folding means, 11a, 11b, 11c, 11d. Two tapes 2 are fed to the folding means 10, 11a and converge to meet approximately coextensively only adjacent to the folding means.

Two superimposed coextensive film tapes are supplied to the folding means 10, 11b.

The folding means 10, 11c and 10, 11d receive single-ply film tapes. By the folding means 10, 11d the marginal portions of the film tape are infolded so that they overlap to form a three-ply film tape having the cross-section shown in FIG. 3d.

Figure 3A:
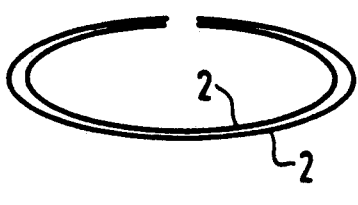
FIGS. 3a to 3d are sectional views showing the tapes which have been folded by the folding means and representing the profile of the folded tapes.
Figure 3B:
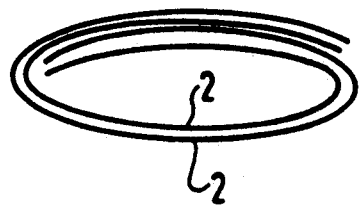
Figure 3C:
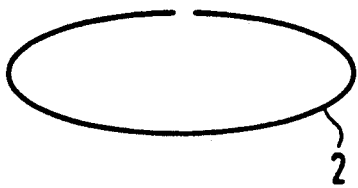
Figure 4A:
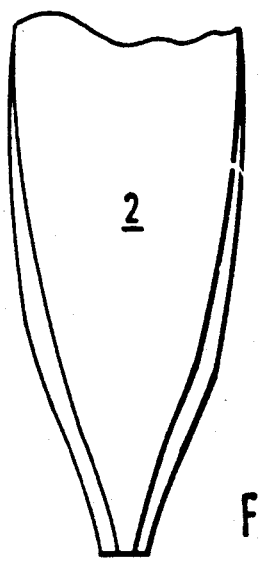
FIGS. 4a, b and c are a folded tape, a top plan view of a folding means, and a rear elevation of a folding means, respectively, for symmetrically folding the tapes.
Figure 4B:
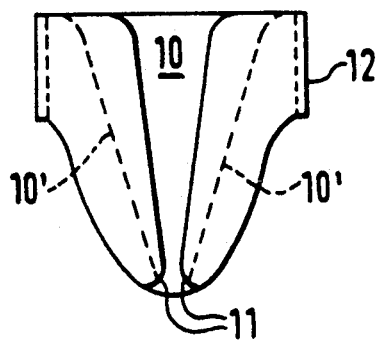
Figure 4C:
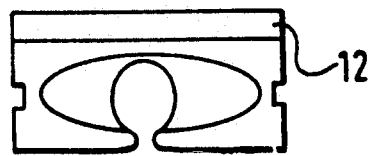

FIGS. 4b and 4c illustrate folding means 10, 11 by which a single film tape or two superimposed coextensive film tapes can be folded to form the folded tape having the cross-section shown in FIGS. 3a and 3c. For that purpose the folding plates 11 of the folding means 10, 11 shown in FIG. 4b have a radius of curvature decreasing in the direction of travel and symmetrically approach each other in said direction to a final distance which is approximately as large as the width of the non-folded middle portion of the tape. The dotted lines 10' in FIG. 4b indicate that region of the folding means in which the folding side portions begin to curve.

Figure 5B:
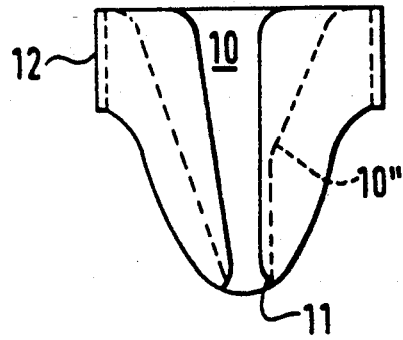
Figure 5C:
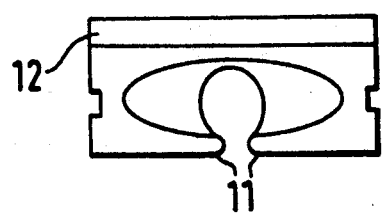

The folding means 10, 11 shown in FIGS. 5b and 5c comprises infolding portions 11, which have a radius of curvature which decreases in the direction of travel and nonsymmetrically approach each other in said direction to a distance which is approximately as large as the width of the non-folded middle portion of the tapes 2. The nonsymmetrical shape of the folding portions is indicated by the noted line 10'', which indicates the configuration at the beginning of the curvature.

Figure 3D:
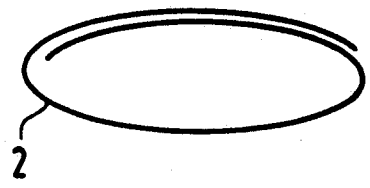
Figure 5A:
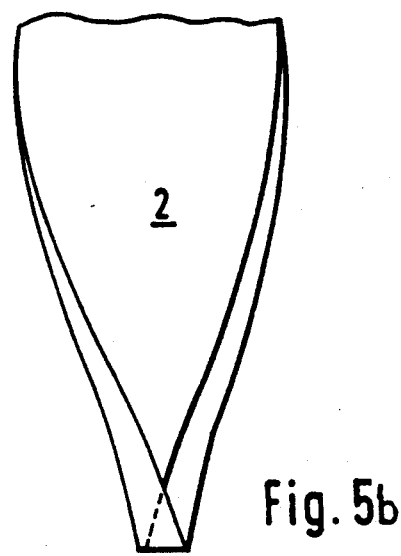
FIGS. 5a, b and c are a folded tape, a top plan view of a folding means, and a rear elevation of a folding means, respectively, for folding the marginal portions of the tapes so that they overlap each other.

The folding means shown in FIGS. 4b and 4c may also be used to fold film tapes so that they have the cross-section shown in FIGS. 3b and 3d and, e.g., the width of the thread guide at the exit may be only about 3 mm if the tape has a width of 9 mm.

Folding portions which at their exit have a width which is less than one-half of the width of the tape may be used for multiple folding operations although such operations cannot always exactly be controlled.

Figure 6:
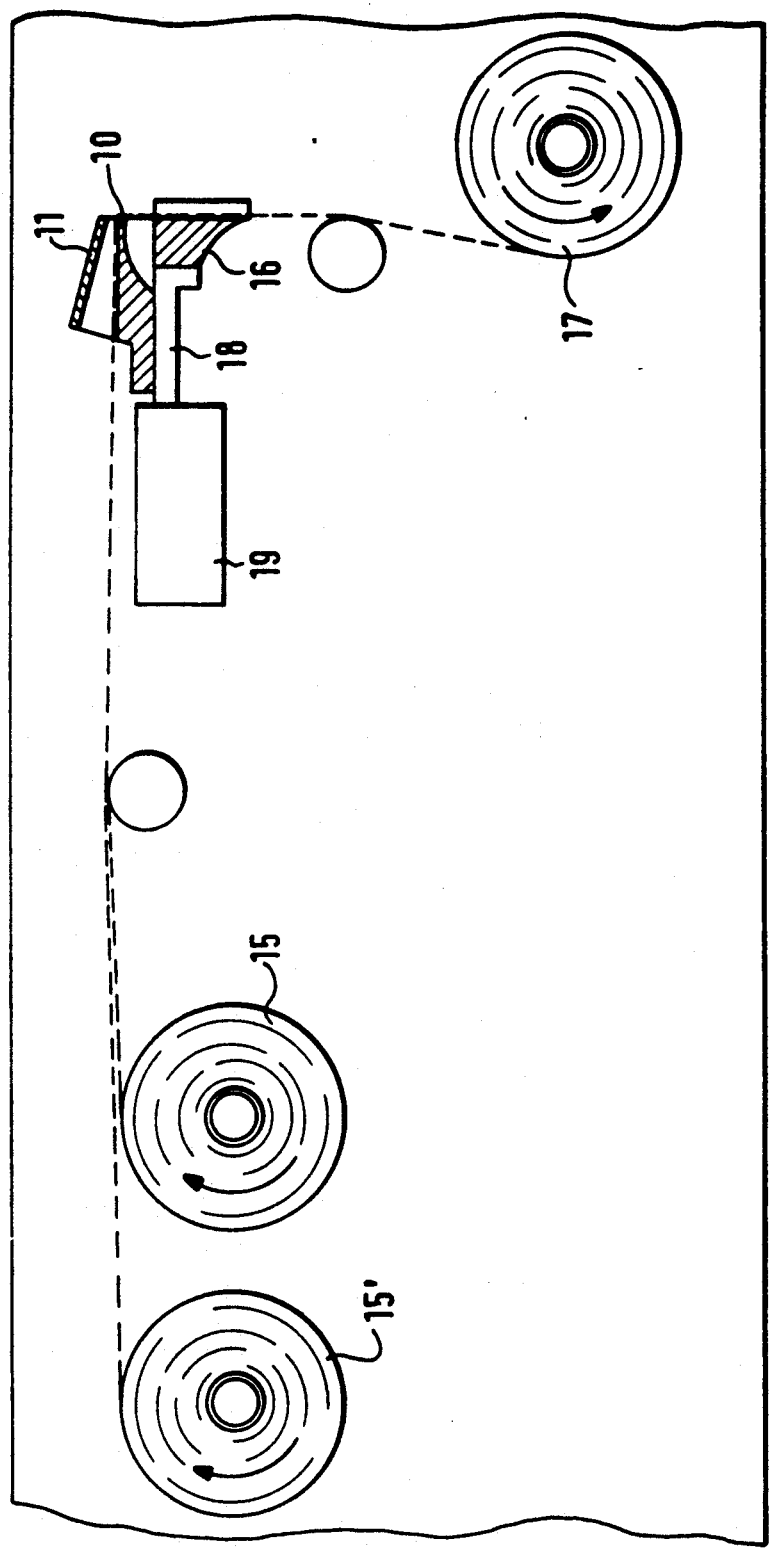
FIG. 6 is a diagrammatic side elevation showing means for folding cold oriented tapes on themselves.

In the apparatus shown in FIG. 6, wider tapes are unwound from the spools 15, 15' in such a manner that the tapes are approximately coextensively superimposed as they are fed to the folding means 10, 11. When the wider tapes have been unwound and superimposed, they are pulled through the folding means 10, 11 and are thus folded on themselves. The folded tapes are deflected as shown and after moving past a traversing guide 16 are wound as tapes folded on themselves on a second spool 17. The folding means 10, 11 are basically similar to those described with reference to FIGS. 2 to 5 and the holder 18 for said folding means and the traversing guide 16 are mounted in a housing 19 for reciprocation in a direction which is parallel to the axes of the spools 15, 17 so that the tapes can uniformly be wound on the spool 17 throughout the length thereof.

It will be understood that the wide tapes may directly be received from a stretching mechanism rather than from spools 15, 15'.

We claim:

1. An apparatus for manufacturing oriented tapes folded on themselves, said apparatus comprising
   a stretching and setting mechanism including godets, over which a tape is caused to move in the form of consecutive loops,
   two of said godets
   folding means interposed between two of said godets for folding of the tape, said folding means including a bottom plate extending substantially parallel to incoming tape, and shell-like folding portions laterally adjoining said bottom plate and having openings facing each other and having a radius of curvature decreasing in the direction of travel of the tape and in said direction converging towards each other so that a final distance between said folding portions is approximately as large as a width of a non-folded middle portion of the tape.

2. An apparatus according to claim 1, wherein said shell-like folding portions have a radius of curvature decreasing in the direction of travel and said folding portions nonsymmetrically approach each other in the direction of travel to a final distance approximately as large as the width of the non-folded middle portion of the tape.

3. An apparatus according to claim 1, wherein said folding portions are succeeded by a roller in the direction of travel of the tape.

* * * * *